Patented Mar. 11, 1952

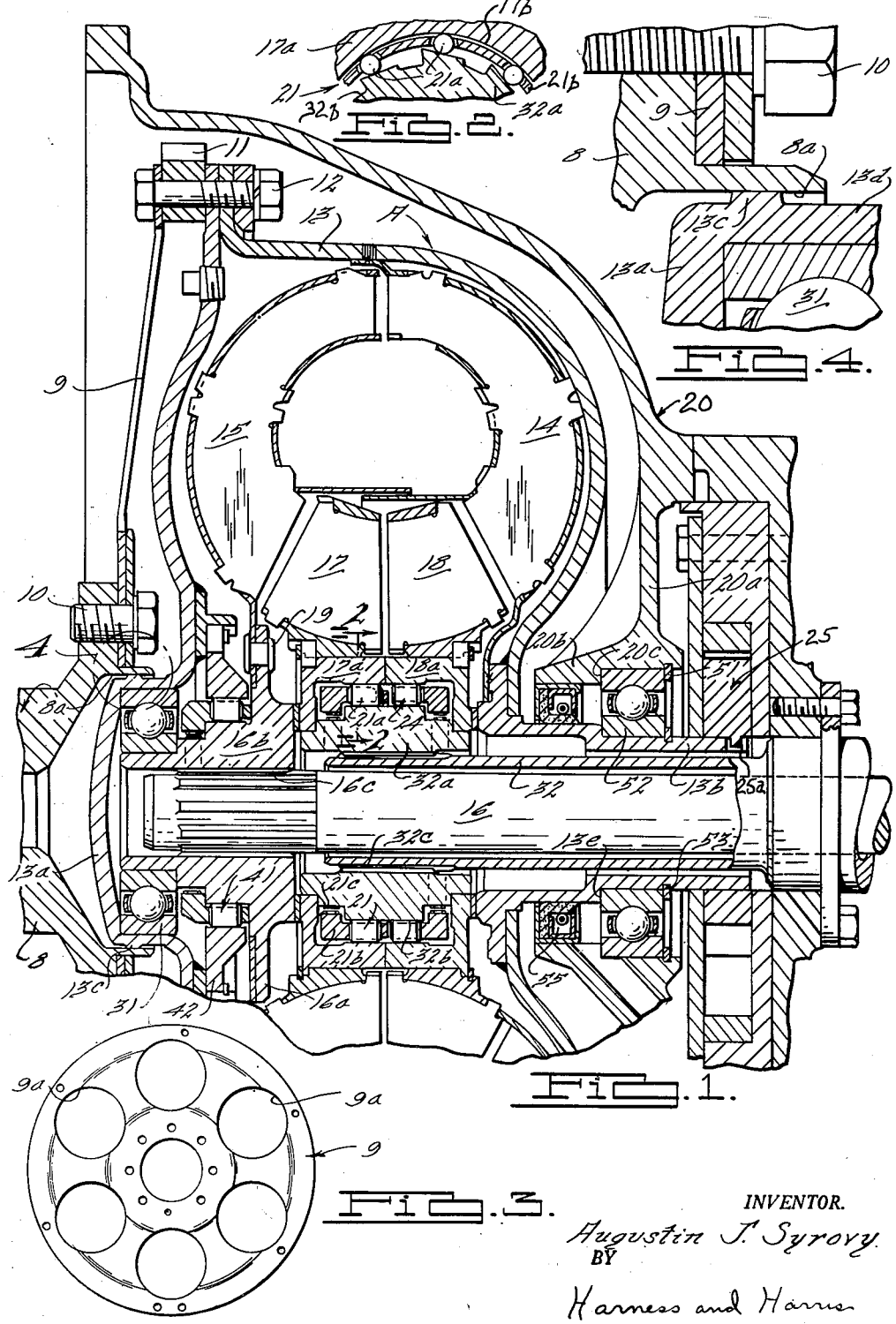

2,588,668

UNITED STATES PATENT OFFICE 2,588,668

FLUID COUPLING MOUNTING

Augustin J. Syrovy, Detroit, Mich., assignor to Chrysler Corporation, Highland Park, Mich., a corporation of Delaware Application February 23, 1949, Serial No. 77,939

13 Claims. (Cl. 60—54)

This invention relates to fluid power transmitting devices and particularly to the means for mounting a hydrokinetic torque converter or the like between the driving and driven elements of a power transmitting train.

It is well known that the rotation of a hydrokinetic torque converter and the circulation of the working fluid within the casing of such a torque converter unit creates a breathing or bellows action within the converter that causes portions of the torque converter casing which may be formed from flexible or resilient material such as steel stampings, to expand and contract in the direction of the converter's axis of rotation. This breathing of the converter casing is undesirable and is a source of considerable trouble in the conventional converter unit due to the fact that the breathing action has a tendency to open up sealed connections and thus permit leakage of the converter working fluid from within the converter. This breathing of the converter casing also has a tendency to develop noise in the converter unit for the gaps developed between the various contiguous parts of the converter, due to breathing of the casing, may be suddenly closed up by sudden changes in the torque load transmitted by the converter and there results an impact noise as the various contiguous parts of the converter are forced into engagement with one another. The impact loads and variation in the alignment of the converter elements under load also tends to increase wear of the converter element. In addition to the above-mentioned difficulties arising from breathing of the converter casing, it has been found that the axial shift of portions of the converter casing due to breathing of the casing has a tendency to open up gaps between the converter casing and its supporting members which are liable to permit a slight twisting or cocking of the converter about its axis of rotation which give rise to the development of undesirable vibrations in the rotatable converter assembly.

It is a primary object of this invention to provide a mounting means for a rotatable fluid power transmitting unit that will permit breathing of the fluid operated power unit casing in an axial direction without the development of converter oil leakage, noise, wear, vibrations or any other harmful effects.

It is a further object of this invention to provide a flexible drive transmitting connection between a rotatable driving member for the converter unit and the fluid operated power transmitting unit driven thereby which connection will permit axial shift of portions of the casing of the fluid operated power transmitting unit in one direction.

It is an additional object of this invention to provide a mounting means for a rotatable fluid operated power transmitting unit which includes a flexible drive transmitting connection between the driving member for the fluid operated power transmitting unit and the fluid operated power unit casing in combination with a rotatable support for the power unit casing that restricts axial movement of the casing in one direction.

It is a still further object of this invention to provide a supporting connection between a rotatable driving member and a fluid operated power transmitting unit driven thereby which connection will provide a telescopic arrangement to accommodate the axial breathing of the power unit casing while also providing a continuous centering means for supporting the power unit on the driving member.

It is an additional object of this invention to provide a novel means for anchoring a rotatable fluid operated power transmitting unit casing to a supporting housing so as to restrict axial shift of the power unit casing to one direction.

It is a still further object of this invention to provide a flexible drive transmitting element between a driving member for a fluid operated power transmitting unit and a fluid operated power transmitting unit driven thereby which will be light in weight and include means to circulate air about the power unit to thus provide a cooling effect upon the circulating fluid of the power transmitting unit.

Other objects and advantages of this invention will become apparent from a reading of this specification and a consideration of the related drawing wherein:

Fig. 1 is a partial sectional elevational view of a hydrokinetic power transmitting unit embodying this invention;

Fig. 2 is a fragmentary sectional elevational view taken along the line 2—2 of Fig. 1 disclosing the type of one-way brake device employed in this power transmitting unit;

Fig. 3 is a side elevation of the flexible drive transmitting unit; and

Fig. 4 is an enlarged fragmentary sectional elevation of the portion of the converter unit within the circle denoted by the numeral 4 in Fig. 1.

Fig. 1 of the drawing discloses a fluid power transmitting device constituting a hydrokinetic torque converter unit A. Converter unit A is adapted to drivingly connect a prime mover such as a motor vehicle engine to a driven member such as a motor vehicle transmission unit input shaft or the like. The reference numeral 8 represents an end portion of the driving member for the fluid power transmitting unit which in this instance is the engine crankshaft of a motor vehicle power unit. The shaft 8 is drivingly connected to the axially flexible drive transmitting plate 9 by the screw means 10. The drive transmitting plate 9 has an engine starter ring gear 11 mounted on its periphery by the bolt and nut means 12. Also drivingly connected to the drive plate 9 by the bolt and nut means 12 is the torque converter casing 13 within which are mounted the various converter components, namely, the impeller member 14, the turbine or runner member 15, and the primary and secondary guide wheel members or reaction wheels 17 and 18 respectively. The vaned impeller wheel 14 forms a part of and is fixedly connected to the converter casing 13 and is accordingly adapted to be rotatably driven by the driving shaft 8. The vaned turbine wheel 15 is drivingly connected by rivet means 19 to a radially extending flange portion 16a formed on the hub 16b that is connected by splines 16c to the forward end portion of the driven shaft member 16.

The driven shaft member 16 is adapted to transmit drive from the torque converter unit A to any appropriate driven mechanism. The forward end of driven shaft hub portion 16b is piloted in the axially extending annular seat 13a formed in the converter housing 13. A ball bearing assembly 31 rotatably supports the forward end of driven shaft hub portion 16b in the converter housing seat 13a. The rear end portion of driven shaft 16 is rotatably supported by a similar type of bearing assembly not shown.

The vaned primary guide wheel 17 is rotatably supported within the converter housing 13 by means of the guide wheel hub portion 17a that is rotatably mounted, by means of a one-way brake device 21, on an axially extending sleeve 32 that is fixed to and projects from the relatively stationary housing 20. Sleeve 32 has a hub member 32a splined thereto at 32c which hub member supports the overrunning or one-way brake device 21. As clearly shown in Fig. 2, the one-way brake device 21 comprises rollers 21a mounted within a cage member 21b. The cage member 21b is normally urged into drive transmitting position by means of a tension spring 21c (see Fig. 1). Cam surfaces 32b, formed on the outer peripheral surface of the sleeve hub member 32a, cooperate with the clutch rollers 21a and the brake device outer race formed by the inner peripheral surface 17b of the guide wheel hub member 17a so as to permit only forward or clockwise rotation of the guide wheel 17 when looking in the direction of arrows 2—2 of Fig. 1. It is thought to be obvious that the one-way brake 21 will permit only forward rotation to be transmitted to guide wheel 17 by the forward rotation of the impeller 14 while preventing rotation of the guide wheel 17 in a reverse or counterclockwise direction.

The secondary guide wheel 18 is rotatably mounted on the sleeve hub member 32a by means of the hub portion 18a and the overrunning or one-way brake device 24. The one-way brake device 24 is similar in design and operation to the brake device 21, shown in Fig. 2. The brake device 24 is arranged to prevent rotation of guide wheel 18 in a counterclockwise direction when looking from the forward or driving end of the power transmitting unit in the direction of arrows 2—2 of Fig. 1.

An overrunning or one-way brake device 41 is mounted betweeen the hub portion 16b of driven shaft 16 and the encircling annular ring 42 that is fixedly mounted to the inner wall of the converter housing 13. This one-way brake device 41 is similar to the one-way brakes 21 and 24 but reversely arranged so as to prevent the speed of the driving shaft 8 from dropping below the speed of the driven shaft 16. Such an arrangement is quite advantageous due to the fact that it provides a means for obtaining engine braking in an engine driven power transmitting device having a slip characteristic. Without some positive lock-up means between the driven shaft 16 and the driving shaft 8, on coast drive, slip would occur in the torque converter unit that would tend to nullify the braking effect of the power unit drivingly connected to the shaft 8. The brake device 41 has particular importance in motor vehicle drive for not only does it provide a means for obtaining engine braking on coast drive, but it also provides a means for automatically locking the driven shaft 16 to the driving shaft 8 to facilitate starting of the engine unit that is connected to shaft 8 by towing or the like. The overrunning or one-way brake device 41 while similar in design to the one-way brake device 21 shown in Fig. 2 has the cams on the driven shaft hub portion 16b, that cooperate with the rollers of the device 41, slanted in a direction opposite to that of the cam surfaces 32b. Such an arrangement insures lock-up of the brake device 41 when the driven shaft 16 drives the driving shaft 8 in a forward or clockwise direction (looking in the direction of arrows 2—2 of Fig. 1).

The torque converter unit A includes a gear type oil pump 25 having a driving gear which is directly connected by pin means 25a to the axially extending flange portion 13b of the rotatable converter casing 13. The pump 25 draws oil from a sump (not shown) and circulates it through the converter unit, lubricating system and other associated hydraulically operated mechanisms (not shown). This pump 25 provides pressure fluid for lubricating purposes as well as for actuation of the various hydraulically operated control mechanisms (not shown) associated with the converter. The circulation of oil through the converter, by the pump 25, provides a means for maintaining the converter full of oil whenever shaft 10 is rotating. Furthermore, this circulation of the working fluid through the converter and the lubricating and control systems provides a means for dissipating the heat of the converter fluid and cooling the converter fluid. To further assist in the cooling of the converter fluid, apertures 9a (see Fig. 3) are provided in the flexible drive plate 9 to provide a fan construction to circulate air about the converter casing. The converter casing 13 transmits the heat of the working fluid of the converter and this casing 13 provides a secondary heat transfer or cooling surface for the working fluid circulating within the converter casing. This fan action of the perforated drive transmitting plate 9 circulates air across the outer surfaces of the converter casing 13 and tends to reduce the temperature of the fluid within the converter casing and keep the cooling load of the cooler for the converter fluid (not shown) at a minimum.

The relatively stationary outer housing 20 has a wall portion 20a from which there projects a forwardly directed, axially extending, sleeve-like, flange portion 20b. Fixedly mounted in the housing flange 20b by means of the snap ring 51 is a ball bearing assembly 52. Snap ring 51 holds the outer race of bearing assembly 52 against a shoulder 20c formed in the housing flange 20b and prevents either forward or rearward axial shift of the bearing assembly 52.

Bearing assembly 52 rotatably supports the rearwardly directed, axially extending flange portion 13b of the torque converter casing 13. Casing flange 13b is formed with a shoulder portion 13c which seats against the forward edge of the inner race of bearing assembly 52. Snap ring 53 locks the inner race of bearing assembly 52 against the shoulder 13e of the axially extending flange 13b of the converter casing 13. The particular arrangement of the anchored bearing assembly 52 and the associated portions of the housing flange 20b and converter casing flange 13b provides means that cooperate to fixedly anchor the casing flange 13b against either forward or rearward axial movement. A suitable fluid seal 55 is mounted between the housing flange 20b and the converter casing flange 13b.

The forward portion of converter casing 13 includes the axially extending forwardly directed, casing seat 13a in which is rotatably mounted the forward portion of the converter driven shaft 16 as previously mentioned. Due to the anchoring of converter casing flange 13b to the housing flange 20b by the bearing assembly 52, provision is made for permitting the casing seat portion 13a to expand and contract axially so as to absorb the breathing tendencies of the converter casing. Casing seat 13a is piloted within an axially extending bore 8a (see Fig. 4) in the driving shaft member 8 that transmits drive to the converter unit A. A bearing means, such as the annular rib 13c, is provided on the sleeve-like flange portion 13d of the casing seat 13a and extends between the seat 13a and the inner wall of the bore 8a in driving shaft 8. This rib-like bearing 13c permits the sliding telescopic action between shaft 8 and casing 13 that is necessary to accommodate the breathing tendencies of the converter casing 13. The bearing rib 13c not only provides a sliding connection between the converter casing 13 and the driving member 8 but in addition it acts as a centering means to prevent twisting or cocking of the converter unit A about its axis of rotation. It is thought to be obvious that the centering means 13c may be a radially extending projection carried by either the driving member 8 or the casing seat portion 13a. The relatively small axially extending dimension or width of the centering rib 13c materially reduces the bearing surface of the casing seat portion 13a on the walls of the bore 8a in driving member 8 and provides a freely slidable connection to accommodate the axial shift of portions of the converter casing 13 resulting from the breathing tendencies previously described. The depth of the bore 8a in driving member 8 is sufficient to prevent contact between the end of seat 13a and the end of the bore thus there is never contact of these relatively movable portions.

As a result of the construction herein disclosed a mounting for a fluid power transmitting coupling has been provided which will permit breathing of the casing of the coupling without the usual attendant disadvantages and difficulties.

I claim:

1. In combination a driving shaft, a driven shaft axially aligned with said driving shaft, a rotatable fluid operated torque transmitting device mounted between said shafts comprising a flexible, fluid containing, outer casing having drive transmitting elements mounted therein, a flexible plate member drivingly connecting said driving shaft to the casing of said torque transmitting device, means drivingly connected between certain of the drive transmitting elements of said torque transmitting device and said driven shaft, the casing of said torque transmitting device including flexible portions that have a tendency to expand and contract in an axial direction while said torque transmitting device is transmitting a torque load between said shafts, a relatively fixed housing surrounding said torque transmitting device, a first bearing means fixedly mounted in said housing and rotatably supporting a first portion of said casing in said housing and anchoring said first portion of the casing against axial movement, and a second bearing means carried by a second, axially movable, portion of said casing rotatably supporting said second portion of said casing on said driving shaft, said second bearing means providing means for the axial movement of said second portion of said casing and including means arranged to prevent cocking of said casing relative to its axis of rotation.

2. In combination a driving shaft, a driven shaft, a rotatable fluid operated power transmitting device comprising a flexible casing and enclosed fluid circulating impeller and turbine elements, a flexible member drivingly connecting said driving shaft to the casing of said power transmitting device and to the impeller element, means drivingly connected between the turbine element of said power transmitting device and said driven shaft, said power transmitting device casing being such as to have flexible portions with a tendency to expand and contract in an axial direction when the device is operating under load, a relatively fixed support adjacent a first portion of the casing of said power transmitting device, a first bearing means rotatably supporting said first portion of said casing in said support and anchoring said first portion of the casing against axial movement, and a second bearing means extending between a second flexible portion of said casing and said driving shaft rotatably supporting said second portion of said casing on said driving shaft, said second bearing means providing means for axial movement of said second portion of said casing and including means to prevent twist of said casing about its axis of rotation.

3. In combination a driving shaft, a driven shaft, a rotatable fluid operated power transmitting device drivingly connecting said shafts, said power transmitting device including a fluid containing casing having flexible portions with a tendency to expand and contract in an axial direction when said device is rotated, a relatively fixed housing adjacent axially flexible portions of the casing of said power transmitting device, a first bearing means rotatably supporting a first portion of said casing in said housing including means to anchor said first portion of the casing against axial movement, and a second bearing means extending between a second portion of said casing and said driving shaft rotatably supporting said second portion of said casing on said driving shaft, said second bearing means including means to provide for axial movement of said second portion of said casing relative to said driving shaft and means acting as a centering means for said casing to prevent twist of said casing about its axis of rotation.

4. In combination a driving shaft, a driven shaft axially aligned therewith, a rotatable fluid operated power transmitting device including a fluid filled casing containing rotatable drive transmitting elements mounted between said shafts, a flexible drive transmitting member extending radially from said driving shaft and drivingly connecting said driving shaft and the casing of said power transmitting device, means drivingly connected between certain of the drive transmitting elements of said power transmitting device and said driven shaft, said power transmitting device casing including flexible, axially extending, portions having a tendency to expand and contract in an axial direction when said device is transmitting power, a relatively fixed member adjacent a first axially extending portion of said power transmitting device casing, a first bearing means fixedly mounted on said fixed member and rotatably supporting said first axially extending portion of said casing and connecting said first portion of said casing to said fixed member to anchor said first portion of the casing against axial movement, and a second bearing means extending between a second axially extending portion of said casing and one of said shafts and rotatably supporting said second portion of said casing on said one of said shafts, said second bearing means including means to provide for axial movement of said second portion of said casing and means for centering and maintaining alignment of said shafts to prevent twist of said casing about its axis of rotation.

5. In a torque transmitting device, a fixed support, a driving member, a driven member, a rotatable hydraulic torque transmitting coupling comprising a fluid filled, flexible casing with contained drive transmitting elements drivingly connecting said driving and driven members, said torque transmitting coupling having a flexible drive transmitting plate connected between said casing and said driving member providing means for axial shift of a first portion of said coupling casing relative to said driving member, and means anchoring a second portion of said coupling casing to said support to restrict the axial movement of said second portion of said coupling casing, the flexible plate having integrally formed apertures therethrough providing means to control the flexibility of the plate and providing a fan for circulating air across the coupling casing during rotation thereof.

6. In a torque transmitting device, a fixed support, a driving member, a driven member, a rotatable hydraulic torque transmitting coupling drivingly connecting said driving and driven members, said torque transmitting coupling including a fluid filled casing having portions adapted to move axially, a flexible drive transmitting plate connected between said driving member and said casing providing means for axial shift of a first portion of said coupling casing relative to said driving member, and means anchoring a second portion of said coupling casing to said support to restrict the axial movement of said second portion of said coupling casing, the flexible plate having apertures therein providing means to control the flexibility of the plate and providing a fan for circulating air across the coupling casing during rotation thereof, and means extending between said casing and one of said members slidably supporting a third portion of said coupling casing on one of said members for relative axial movement therebetween and providing a self centering means for said coupling casing relative to said one member.

7. In combination a driving shaft, an axially extending bore in an end of said driving shaft, a driven shaft axially aligned with said driving shaft and spaced therefrom, a hydrokinetic torque converter unit mounted about a portion of said driven shaft and drivingly connected to its driven member, said torque converter unit including a flexible casing having axially extending, sleeve-like flange portions at opposite sides thereof concentrically arranged with respect to said shafts, a relatively fixed support member rotatably supporting one of the sleeve-like flange portions of said converter casing, said one flange portion being journalled in said support member to prevent axial movement of said one flange relative thereto, the other of said sleeve-like flange portions extending into the bore in said driving shaft, bearing means extending between the wall of the bore in said driving shaft and said other flange portion of said casing arranged to provide for shift of said other flange of said casing axially along said bore, and a flexible drive transmitting member drivingly connecting said driving shaft to a portion of said torque converter casing.

8. In combination a driving shaft, an axially extending bore in an end of said driving shaft, a driven shaft axially aligned with said driving shaft and spaced therefrom, a hydrokinetic torque converter unit mounted about a portion of said driven shaft and drivingly connected to its driven member, said torque converter unit including a flexible casing having axially extending, sleeve-like flange portions at opposite sides thereof concentrically arranged about said shafts, a relatively fixed support member rotatably supporting one of the sleeve-like flange portions of said converter casing, said one flange portion being journalled in said support member to prevent axial movement of said one flange relative thereto, the other of said sleeve-like flange portions extending into the bore in said driving shaft, bearing means extending between said other flange portion and said driving shaft arranged to provide for shift of said other flange axially along said bore, and a flexible drive transmitting member drivingly connecting said driving shaft to a portion of said torque converter casing, said drive transmitting member being a radially extending plate having a plurality of axially extending apertures therethrough that control the flexibility of the plate and provide a fan member to circulate air about the casing of the converter.

9. In combination a driving shaft, an axially extending bore in an end of said driving shaft, a driven shaft axially aligned with said driving shaft and spaced therefrom, a hydrokinetic torque converter unit mounted about a portion of said driven shaft and drivingly connected to its driven member, said torque converter unit including a flexible casing having axially extending, sleeve-like flange portions at opposite sides thereof, a relatively fixed support member rotatably supporting one of the sleeve-like flange portions of said converter casing, said one flange portion being journalled in said support member to prevent axial movement of said one flange relative thereto, the other of said sleeve-like flange portions extending into the bore in said driving shaft, bearing means extending between said other flange portion and said driving shaft arranged to provide for shift of said other flange axially along said bore, said bearing means including a radially extending, outwardly projecting rib on said other flange slidably engaging the inner wall of the bore in said driving shaft to provide a bearing member that centers the casing relative to the axis of said driving shaft and prevents cocking of the casing relative to said shaft axis, and a radially extending, flexible plate drivingly mounted on said driving shaft and drivingly connected to a portion of said converter casing.

10. In combination, a rotatable shaft, a rotatable, fluid operated, torque transmitting device having a flexible casing with axially extending portions aligned with said shaft, means rotatably supporting a first axially extending portion of the casing of said torque transmitting device and restraining axial movement of said first portion of said casing, another axially extending portion of said casing telescopically arranged and supported on said shaft by means providing for axial movement of said second portion of said casing, rib-like centering means on one of the telescopically arranged elements to maintain axial alignment of said shaft and the casing of said torque transmitting device, and a radially extending, axially flexible, drive transmitting member connected between said shaft and a portion of the casing of said torque transmitting device.

11. In combination, a rotatable shaft, a rotatable fluid power transmitting unit aligned with said shaft comprising a flexible casing member enclosing driving and driven elements, a flexible drive transmitting means drivingly connected between said shaft and said casing member, and telescopically arranged, axially aligned, slidably interengaged portions on said shaft and said casing member arranged to maintain alignment of said shaft and casing member while providing means for axial shift of portions of said casing member relative to said shaft.

12. In combination a rotatable shaft, a rotatable, fluid power transmitting unit aligned with said shaft comprising a flexible casing member that encloses relatively rotatable driving and driven elements, a flexible drive transmitting means drivingly connected between said shaft and said casing member, and telescopically arranged, axially aligned, slidably interengaged portions on said shaft and said casing member maintaining alignment of said shaft and casing member while providing for axial shift of said portions of said casing, said last mentioned telescopically arranged portions including a radially extending annular rib on said casing member engageable with an axially extending flange on said shaft to maintain alignment of said shaft and casing member.

13. In combination a rotatable shaft, a rotatable, fluid power transmitting unit aligned with said shaft comprising a flexible casing enclosing fluid actuated relatively rotatable driving and driven elements, a flexible drive transmitting means drivingly connected between said shaft and said casing member, and telescopically arranged, axially aligned, slidably interengaged portions on said shaft and said casing member maintaining alignment of said shaft and casing member while providing for axial shift of portions of said casing member relative to said shaft, said last mentioned telescopically arranged relatively movable portions including a radially extending annular rib on said casing member engageable with an axially extending annular flange on said shaft, and means anchoring a portion of said casing member against movement while providing for axial movement of other portions of said casing member.

AUGUSTIN J. SYROVY.

REFERENCES CITED

The following references are of record in the file of this patent:

UNITED STATES PATENTS

| Number | Name | Date |
| --- | --- | --- |
| 1,604,925 | Macdonald | Oct. 26, 1926 |
| 1,636,389 | Simms | July 19, 1927 |
| 1,786,433 | Klimek | Dec. 30, 1930 |
| 1,868,146 | Kiep | July 19, 1932 |
| 1,908,627 | Moran et al. | May 9, 1933 |
| 2,142,178 | Cole et al. | Jan. 3, 1939 |
| 2,143,312 | Griswold | Jan. 10, 1939 |
| 2,377,009 | Heyer | May 29, 1945 |
| 2,473,809 | Miller | June 21, 1949 |